United States Patent
Vossiek et al.

(10) Patent No.: US 11,774,551 B2
(45) Date of Patent: *Oct. 3, 2023

(54) METHOD AND DEVICE FOR COMPENSATING FOR INTERFERING INFLUENCES

(71) Applicant: Symeo GmbH, Neubiberg (DE)

(72) Inventors: Martin Vossiek, Fürth (DE); Peter Gulden, Erding (DE); Michael Gottinger, Buckenhof (DE)

(73) Assignee: Symeo GmbH, Neubiberg (DE)

(*) Notice: Subject to any disclaimer, the term of this patent is extended or adjusted under 35 U.S.C. 154(b) by 41 days.

This patent is subject to a terminal disclaimer.

(21) Appl. No.: 16/613,099

(22) PCT Filed: Apr. 25, 2018

(86) PCT No.: PCT/EP2018/060553
§ 371 (c)(1),
(2) Date: Nov. 12, 2019

(87) PCT Pub. No.: WO2018/206290
PCT Pub. Date: Nov. 15, 2018

(65) Prior Publication Data
US 2021/0080540 A1 Mar. 18, 2021

(30) Foreign Application Priority Data
May 12, 2017 (DE) .................. 10 2017 110 404.6

(51) Int. Cl.
*G01S 13/84* (2006.01)
*G01S 7/40* (2006.01)
(Continued)

(52) U.S. Cl.
CPC .............. *G01S 7/354* (2013.01); *G01S 7/285* (2013.01); *G01S 7/40* (2013.01); *G01S 7/4017* (2013.01); *G01S 13/84* (2013.01); *G01S 13/82* (2013.01)

(58) Field of Classification Search
CPC ............ G01S 7/354; G01S 7/285; G01S 7/40; G01S 7/4017; G01S 13/84
See application file for complete search history.

(56) References Cited

U.S. PATENT DOCUMENTS 4,388,622 A 6/1983 Fletcher, Jr.
5,423,076 A * 6/1995 Westergren ............ H04B 1/403
331/25

(Continued)

FOREIGN PATENT DOCUMENTS

CN 101911511 A 12/2010
CN 104573772 A * 4/2015
(Continued)

OTHER PUBLICATIONS

S. Scheiblhofer, S. Schuster, M. Jahn, R. Feger and A. Stelzer, "Performance analysis of cooperative FMCW radar distance measurement systems," 2008 IEEE MTT-S International Microwave Symposium Digest, 2008, pp. 121-124, doi: 10.1109/MWSYM.2008.4633118. (Year: 2008).*

(Continued)

*Primary Examiner* — Timothy A Brainard
*Assistant Examiner* — Ismaaeel A. Siddiquee
(74) *Attorney, Agent, or Firm* — Schwegman Lundberg & Woessner, P.A.

(57) ABSTRACT

A method for compensating for noise in a secondary radar system is described. The method includes, using a first transceiver, transmitting, in temporally overlapping manner, a first transmission signal containing a first interfering (Continued)

component and a second transmission signal containing a second interfering component, and compensating for at least one of phase shifts or frequency shifts resulting from the first and second interfering components by evaluation of the first and second transmission signals.

22 Claims, 2 Drawing Sheets

(51) Int. Cl.
    *G01S 7/35*     (2006.01)
    *G01S 7/285*     (2006.01)
    *G01S 13/82*     (2006.01)

(56) References Cited

U.S. PATENT DOCUMENTS

| | | | |
|---|---|---|---|
| 6,278,398 B1 | 8/2001 | Vossiek et al. | |
| 6,625,424 B1* | 9/2003 | Mohindra | H04B 1/30 455/87 |
| 7,623,064 B2* | 11/2009 | Calderbank | G01S 7/024 342/194 |
| 7,940,743 B2 | 5/2011 | Seisenberger et al. | |
| 10,371,800 B2 | 8/2019 | Huemer et al. | |
| 2006/0181448 A1* | 8/2006 | Natsume | G01S 7/36 342/111 |
| 2012/0200453 A1* | 8/2012 | Brosche | H03M 3/47 342/175 |
| 2017/0176583 A1 | 6/2017 | Gulden et al. | |
| 2021/0072349 A1* | 3/2021 | Mayer | G01S 7/35 |
| 2021/0080541 A1 | 3/2021 | Vossiek et al. | |
| 2021/0149034 A1 | 5/2021 | Yamanouchi | |

FOREIGN PATENT DOCUMENTS

| | | | |
|---|---|---|---|
| CN | 106461770 A | 2/2017 | |
| DE | 10157931 A1 | 6/2003 | |
| DE | 102008050327 A1 | 5/2010 | |
| DE | 102014104273 | 10/2015 | |
| DE | 102014104273 A1 * | 10/2015 | G01S 13/003 |
| DE | 102014104273 A1 | 10/2015 | |
| DE | 102015100804 A1 | 7/2016 | |
| JP | H0815422 | 1/1996 | |
| JP | 2000206234 A | 7/2000 | |
| KR | 20130079868 A | 7/2013 | |
| WO | WO-9838524 A1 | 9/1998 | |
| WO | WO-2010019975 A1 | 2/2010 | |
| WO | WO-2017118621 | 7/2017 | |
| WO | WO-2018206290 A1 | 11/2018 | |
| WO | WO-2018206755 A1 | 11/2018 | |

OTHER PUBLICATIONS

"German Application No. 10 2017 110 404.6, Search Report dated Mar. 20, 2018", (dated Mar. 20, 2018), 7 pgs.
"International Application No. PCT/EP2018/060553, International Search Report and Written Opinion dated Jul. 25, 2018", (Jul. 25, 2018), 20 pgs.
Appel, Soenke, et al., "MIMO FMCW Reader Concept for Locating Backscatter Transponders", IEEE Transactions on Microwave Theory and Techniques, Plenum, USA, vol. 64, No. 9, (Sep. 1, 2016), 2955-2967.
Roehr, Sven, et al., "Precise Distance and Velocity Measurement for Real Time Locating in Multipath Environments Using a Frequency-Modulated Continuous-Wave Secondary Radar Approach", IEEE Transactions on Microwave Theory and Techniques, vol. 56, Issue 10 [abstract only], (Sep. 12, 2008), 2329-2339.
Roehr, Sven, et al., "Wireless local positioning—existing solutions and novel system concepts", 2015 IEEE MTT-S International Conference on Microwaves for Intelligent Mobility (ICMIM), (Apr. 27, 2015), 4 pgs.

Scheiblhofer, Stefan, et al., "Performance Analysis of Cooperative FMCW Radar Distance Measurement Systems", Microwave Symposium Digest, 2008 IEEE MTT-S International, IEEE, Piscataway, NJ, (Jun. 15, 2008), 121-124.
"U.S. Appl. No. 16/613,102, Non Final Office Action dated Nov. 22, 2021", 42 pgs.
"U.S. Appl. No. 16/613,102, Preliminary Amendment filed Nov. 12, 2019", 9 pgs.
"European Application Serial No. 18724837.2, Communication Pursuant to Article 94(3) EPC dated Dec. 6, 2021", 7 pgs.
"German Application No. 10 2017 110 403.8, Search Report dated Apr. 20, 2018", (Apr. 20, 2018), 8 pgs.
"International Application No. PCT/EP2018/062192, International Preliminary Report on Patentability dated Nov. 21, 2019", (w/ English Translation), 8 pgs.
"International Application No. PCT/EP2018/062192, International Search Report and Written Opinion dated Jul. 25, 2018", (Jul. 25, 2018), 20 pgs.
"Japanese Application Serial No. 2019-562291, Notification of Reasons for Refusal dated Jan. 31, 2022", w/o English Translation, 4 pgs.
Pichler, Markus, et al., "Phase-Error Measurement and Compensation in PLL Frequency Synthesizers for FMCW Sensors-I: Context and Application", IEEE Transactions on Circuits and Systems, Part 1: Regular Papers, IEEE Service Center, New York, NY US; vol. 54, No. 5, (May 1, 2007), 1006-1017.
Thurn, Karsten, et al., "Noise in Homodyne FMCW radar systems and its effects on ranging precision", IEEE-MTTS International Microwave Symposium, Digest, IEEE, US, (Jun. 2, 2013), 1-3.
Vossiek, M., et al., "Novel FMCW radar system concept with adaptive compensation of phase errors", Microwave Conference (1996), 26th European, IEEE, Piscataway, NJ USA, (Sep. 6, 1996), 135-139.
"U.S. Appl. No. 16/613,102, Non Final Office Action dated May 31, 2022", 39 pgs.
"U.S. Appl. No. 16/613,102, Response filed Mar. 3, 2022 to Non Final Office Action dated Nov. 22, 2021", 16 pgs.
"U.S. Appl. No. 16/613,102, Response filed Nov. 29, 2022 to Non Final Office Action dated May 31, 2022", 11 pgs.
"Japanese Application Serial No. 2019-562291, Examiners Decision of Final Refusal dated Aug. 29, 2022", w/ English Translation, 6 pgs.
"Japanese Application Serial No. 2019-562291, Response filed Apr. 28, 2022 to Notification of Reasons for Refusal dated Jan. 31, 2022", w/ English Claims, 14 pgs.
"International Application No. PCT/EP2018/060553, International Preliminary Report on Patentability dated Nov. 21, 2019", (w/ English Translation), 8 pgs.
Hao, Honglian, "Research on Radar Reconnaissance Interference System Based on Broadband Digital Channelized Reception", CMFD IT, (Aug. 15, 2016).
Zhong, Shouyong, "LFM Continuous Wave Radar Channel Design and Key Technology Research", Electronic Design Engineering 13, (Jul. 5, 2012).
"Chinese Application Serial No. 201880031284.7, Office Action dated Feb. 20, 2023", w/ English Translation, 21 pgs.
"Chinese Application Serial No. 201880038982.X, Office Action dated Feb. 20, 2023", w/ English Translation, 22 pgs.
"Korean Application Serial No. 10-2019-7033481, Notice of Preliminary Rejection dated Jun. 9, 2023", w/ English Translation, 15 pgs.
Hao, Honglian, "Research on Radar Reconnaissance Jamming System Based on Broadband Digital Channelized Receiver", MS Thesis, Beijing Institute of Technology, w/ English Abstract, (Aug. 15, 2016), 91 pgs.
Zhong, Shouyong, "LFM Continuous Wave Radar Channel Design and Key Technology Research", Electronic Design Engineering 13, w/ English Abstract, (Jul. 5, 2012), 104-107.

* cited by examiner

METHOD AND DEVICE FOR COMPENSATING FOR INTERFERING INFLUENCES

PRIORITY CLAIM TO RELATED APPLICATIONS

This application is a U.S. national stage filing under 35 U.S.C. § 371 of International Application No. PCT/EP2018/060553, filed on 25 Apr. 2018, and published as WO2018/206290 on 15 Nov. 2018, which claims priority to German Application No. 10 2017 110 404.6, filed on 12 May 2017, the benefit of priority of each of which is claimed herein, and which applications and publication are hereby incorporated herein by reference in their entirety.

The invention relates to a method and a device for compensating for interfering influences, in particular phase noise, in secondary radar systems, in particular in radiolocation systems.

Secondary radar systems and systems for radiolocation are known in principle. These may have at least two, spatially separate, non-coherent transceiving units NKSE 1, NKSE 2, each having a local oscillator LO1, LO2 and a mixer M1, M2 (cf. FIG. 1). Owing to the (incoherent) local oscillators LO1, LO2 (due to a spatial separation on account of a certain transmission distance, usually an air transmission distance), a unilateral distance measurement with the accuracy of a primary radar is in principle not possible.

Figure 1:
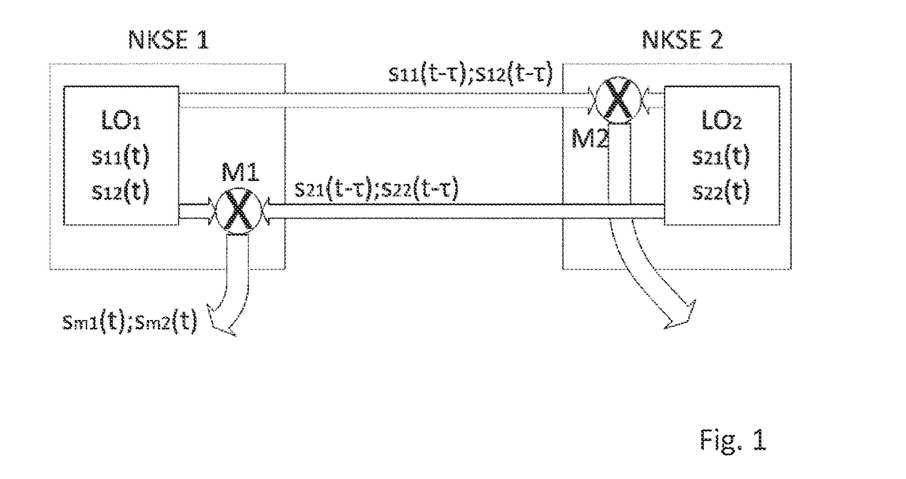
FIG. 1 shows a secondary radar comprising two non-coherent transceiving units.

A secondary radar method (cf. FIG. 1, where T is a channel propagation time) will be described below. The baseband signals of NKSE 1 and NKSE 2 obtained after a mixing process can be described by $$s_{1/2}(t) = A_1 e^{j(\varphi_1(t) \pm \varphi_{n,c1/2}(t) \pm \varphi_{n,c}(t))}$$

where $A_1$ is the signal amplitude, $\varphi_1(t)$ is the phase characteristic of the useful signal, $\varphi_{n,uc1/2}(t)$ is the uncorrelated phase noise (statistically independent in NKSE 1 and 2), and $\varphi_{n,c}(t)$ is the correlated phase noise (same realization in NKSE 1 and 2). In the design of such a non-coherent radar system known from DE 10 2014 104 273 A1, a synthetic measurement signal is generated by multiplication in the spectral range, which requires the transmission of the raw data from both stations to one of the two NKSEs or to a central processing unit.

The signal thus obtained corresponds in principle to the response of a primary radar.

This synthetic measurement signal $$s_m(t) = 2A_1 e^{j(2\varphi_1(t) + \varphi_{n,uc1}(t) - \varphi_{n,uc2}(t))}$$

is characterized in that the influence of the correlated phase noise can be compensated for. This represents a considerable proportion which impairs the signal quality and permits coherent measurements only to a limited extent, if at all. A coherent signal sequence is necessary, for example, for speed estimation, (inverse) synthetic aperture radars or for angle estimation by means of holographic reconstruction.

If the signal-to-noise ratio (SNR) is good, the uncorrelated phase noise nevertheless represents a limit to the accuracy that can be achieved in a positioning system. In addition, the amount of data obtained by analogue/digital conversion is relatively large, and therefore efficient data transfer methods are required in order to assess the raw data from both stations at one location.

DE 10 2014 104 273 A1 discloses a radar system in which data which after a mixing process have been sampled by an A/D converter are transferred from one unit to another (NKSE 1 and NKSE 2) or to a central processing unit. In this case, both units are able to transmit at the same time over the same reciprocal radio channel in a full duplex method, which is why a phase noise of both mixed signals (also referred to as beat signals) in the intermediate frequencies (ZF) is correlated. After a synthetic mixing of these beat signals, an influence of a phase noise and also an interfering influence caused by systematic deviations during signal generation/sampling can be suppressed to a relatively considerable extent, which in particular enables a coherent measurement and a compensation for uncorrelated phase noise and for these disturbances in both NKSEs.

Overall, the accuracy of measurements in known secondary radar systems, particularly in the case of distance measurement, is considered to be in need of improvement.

The object of the invention is to propose a method and a device for compensating for noise, in particular phase noise, or for a systematic deviation in a secondary radar, in particular a radiolocation system, which enables higher accuracy during a measurement (in particular a distance measurement).

This object is achieved in particular by the independent claims.

In particular, the object is achieved by a method for compensating for noise, in particular phase noise, or for a systematic deviation in a secondary radar system, in particular a radiolocation system, comprising a first and at least one second non-coherent transceiving unit, wherein a first first transmission signal containing a first first interfering component, caused by the noise or the systematic deviation, is transmitted by the first transceiving unit, wherein at least one second first transmission signal containing a second first interfering component, caused by the noise or the systematic deviation, is transmitted by the first transceiving unit simultaneously or in a temporally overlapping manner with the first first transmission signal, wherein the transmission signals are preferably such that phase shifts and/or frequency shifts which result from the interfering components are at least partially compensated for during a further processing and evaluation of the transmission signals.

Preferably:
a first second signal and at least one second second signal ($s_{22'}(t)$) is transmitted by the second transceiving unit (simultaneously or in a temporally overlapping manner),
the transmitted first second signal is received by the first transceiving unit as a first second received signal and the transmitted second second signal is received by the first transceiving unit as a second second received signal,
a first measurement signal is generated from the first first transmitted signal and the first second received signal, in particular by mixing or by correlation, preferably in the form of a complex conjugate multiplication, and a second measurement signal is generated from the second first transmitted signal and the second second received signal, in particular by mixing or by correlation, preferably in the form of a complex conjugate multiplication.

One (optionally independent) aspect of the invention lies in the fact that not only is a first first transmission signal or a first measurement signal generated, but also (at least) a second first transmitted signal or second measurement signal, which is such that phase shifts and/or frequency shifts (of measurement frequencies, in particular mixing frequencies or beat frequencies), caused by (phase) noise or systematic shifts, are at least partially cancelled out. As an alternative or in addition, instead of a mixing, a correlation can also be carried out, preferably at low frequencies.

By using a specially adapted signal form, a data transfer, as in the prior art, may possibly be unnecessary. In addition, a remaining portion of (phase) noise (a correlated proportion of the phase noise) can additionally also be suppressed. As a result, it is possible optionally to place lower demands on the quality of the components which are used to generate a high-frequency carrier signal. In addition, the phase noise level in particular does not represent a lower limit for an accuracy of the radar measurement (in particular distance measurement). Particularly when transmission takes place over the same radio channel, use can also be made of spatially distributed transmitting and receiving antennas (in particular because, in contrast to known solutions, a reciprocal transmission channel is not absolutely necessary).

A measurement signal is to be understood to mean in particular a mixed signal which is derived from a transmitted signal from one of the transceiving units (for example the first transceiving unit) and a signal that is received by said transceiving unit (that is to say for example the first transceiving unit) and that comes from another transceiving unit (that is to say for example the second transceiving unit). In particular, such a mixing may be a complex conjugate multiplication of a transmitted signal (from one transceiving unit) by the signal received by another transceiving unit.

Overall, the method enables an effective reduction or (complete) suppression of (correlated) phase noise and/or of a systematic deviation. Thus, for example, the accuracy of a distance measurement in a radiolocation system can be improved.

Preferably, a first interfering component of the first measurement signal and a second interfering component of the second measurement signal are complex conjugate to one another. An effective reduction (or complete suppression) of noise, in particular (correlated) phase noise, can thus take place particularly easily.

The transmission of the second first signal preferably takes place simultaneously or at least in a temporally overlapping manner with the transmission of the first first signal. The transmission of the second second signal preferably takes place simultaneously or at least in a temporally overlapping manner with the transmission of the first second signal. A temporal overlap is to be understood to mean in particular that, at least during 20%, preferably during 50%, of the signal duration of the transmission of the first first signal or of the first second signal, the second first signal or the second second signal is also being transmitted. The transmission of the second second signal and of the first second signal preferably takes place in a temporally overlapping manner with the transmission of the first first signal and of the second first signal. A temporal overlap is to be understood to mean in particular that, at least during 20%, preferably during 50%, of the signal duration of the transmission of the first first and/or second first signal, the first second signal and/or the second second signal is also being transmitted.

Preferably, the first first transmitted signal has at least one first factor which is complex conjugate to a second factor of the second first transmitted signal. In particular, an effective reduction (suppression) of (phase) noise can thus easily take place. In particular, measurement signals which have complex conjugate interfering components can easily be generated (preferably by mixing).

In one preferred embodiment, the first first transmitted signal has at least one frequency ramp with a first slope and the second first transmitted signal has at least one frequency ramp with a second slope, wherein the first slope has a different sign than the second slope, wherein the amounts of the first and second slope are preferably (at least substantially) equal. Measurement signals (mixed signals) which in particular enable a reduction in the (phase) noise can be generated particularly easily from such signals.

A base HF signal for the first and second measurement signal (or for the first first and second first transmitted signal) is preferably generated by the same first HF generator. The associated (correlated) phase noise can then be suppressed particularly effectively.

In general, the first first (and first second) and the second first (and second second) transmitted signal are preferably such that they have a correlated phase noise.

A base HF signal is to be understood to mean in particular a high-frequency signal which comes (directly) from the output of a corresponding generator (oscillator). This base HF signal can then be subsequently modulated if necessary.

The base HF signal and/or the transmitted signals may have a frequency or frequencies of at least 100 MHz or at least 1 GHz.

Preferably, the first transmitted signal or the first measurement signal is based on an output of a first modulation generator and the second transmitted signal or the second measurement signal is based on an output of a second modulation generator. Alternatively, the first first and the second first transmitted signal or the first and the second measurement signal may be based on an output of a joint modulation generator.

The first first transmitted signal may correspond to an output of a/the first modulation generator. The second first transmitted signal may correspond to an output of a second modulation generator.

If a joint modulation generator is used, use may be made in particular of a signal which is generated by means of direct digital synthesis (DDS).

Preferably, a (fundamental) signal for the first first and/or the second first transmitted signal (having a relatively low frequency) is generated and then the respective transmitted signal is modulated by way of a modulation generator, in particular a vector modulator, wherein the first first and/or second first transmitted signal is/are preferably generated by applying a modulation signal to a real or complex input of the modulation generator, in particular vector modulator, preferably such that the second first—preferably mirrored—transmitted signal is generated in addition to the first first transmitted signal.

Preferably, a frequency (preferably containing propagation time information), in particular a beat frequency, is derived from the first and/or second measurement signal. As an alternative or in addition, the measurement signals or signals derived from the measurement signals or parts thereof, in particular a respective frequency (preferably containing propagation time information), preferably a beat frequency, are combined with one another, preferably added to one another.

Preferably, the first measurement signal is generated by a first mixer (in particular by conjugate complex multiplication) and the second measurement signal is generated by a second mixer (in particular by conjugate complex multiplication). Alternatively, the first measurement signal and the second measurement signal may be generated by a joint, in particular complex, mixer (in particular by conjugate complex multiplication). In any case, measurement signals having the desired properties can easily be generated.

In embodiments, the measurement signals may be mixed products of FMCW signals, in particular FMCW ramps, SFCW signals (where SFCW stands for Stepped Frequency Continuous Wave) or OFDM signals (where OFDM stands for Orthogonal Frequency-Division Multiplexing). These signals are preferably generated by way of a (joint) local oscillator.

Preferably, a clock offset of the transceiving units is determined by comparing the measurement signals. The transceiving units can be synchronized from a curve of a (the) clock offset over time. This enables an accurate measurement, in particular distance measurement, in a simple manner.

The object mentioned above is in particular also achieved by a device for compensating for noise, in particular phase noise, or for a systematic deviation in a secondary radar system, preferably a radiolocation system, comprising a first and a second non-coherent transceiving unit, in particular for carrying out the method according to any one of the processing claims, wherein at least the first transceiving unit is configured to generate and transmit a first first transmission signal containing a first first interfering component, caused by the noise or the systematic deviation, and to generate and transmit, simultaneously or in a temporally overlapping manner, at least one second first transmission signal containing a second first interfering component, caused by the noise or the systematic deviation, preferably such that phase shifts and/or frequency shifts which result from the interfering components can be at least partially compensated for during a further processing and evaluation of the transmission signals.

Preferably, the device comprises a measurement signal generating means which is configured such that a first measurement signal is generated from the first first transmitted signal and a first second received signal coming from the second transceiving unit, in particular by mixing, preferably in the form of a complex conjugate multiplication, and/or such that a second measurement signal is generated from the second first transmitted signal and a second second received signal coming from the second transceiving unit, in particular by mixing, preferably in the form of a complex conjugate multiplication.

Preferably, a first interfering component of the first measurement signal and a second interfering component of the second measurement signal are complex conjugate to one another.

The device preferably comprises a transceiver for transmitting a first first signal and a second first signal and for receiving a transmitted first second signal as a first second received signal and a transmitted second second signal as a second second received signal.

The first transceiving unit preferably comprises a transmitting antenna and a receiving antenna such that the transmitting antenna transmits the first first and the second first signal and the receiving antenna receives the first second and second second received signal. Alternatively, the transceiving unit may have a joint transmitting/receiving antenna, wherein the joint transmitting/receiving antenna transmits the first first signal and receives the first second received signal and transmits the second first signal and receives the second second received signal. The second transceiving unit may be configured in a corresponding manner.

The measurement signal generating means comprises in particular one or more mixers.

Furthermore, the measurement signal generating means may be configured to generate the first measurement signal from the transmitted first first signal and the received first second signal, in particular by mixing (preferably by conjugate complex multiplication), and/or to generate the second measurement signal from the transmitted second first signal and the received second second signal, in particular by mixing (preferably by conjugate complex multiplication).

Preferably, the measurement signal generating means comprises a first measurement signal generating unit, in particular a first mixer, and a second measurement signal generating unit, in particular a second mixer, wherein the first measurement signal generating unit generates the first measurement signal, in particular by mixing (preferably by conjugate complex multiplication), and the second measurement signal generating unit generates the second measurement signal, in particular by mixing (preferably by conjugate complex multiplication). Alternatively, the measurement signal generating means may comprise a joint measurement signal generating unit, in particular a joint mixer, wherein the joint measurement signal generating unit generates the first measurement signal, in particular by mixing (preferably by conjugate complex multiplication), and generates the second measurement signal, in particular by mixing (preferably by conjugate complex multiplication).

The device preferably comprises a first HF generator for generating a base HF signal for the first and the second measurement signal or for the first and the second transmitted signal.

In one embodiment, the device comprises a first modulation generator, on the output of which the first first transmitted signal or the first measurement signal is based, and a second modulation generator, on the output of which the second first transmitted signal or the second measurement signal is based.

Alternatively, the device may comprise a joint modulation generator, on the output of which the first first and second first transmitted signal or the first and second measurement signal are based.

The above object is also achieved in particular by the use of a method of the type described above and/or of a device of the type described above for increasing the accuracy of a distance measurement and/or for security-related applications and/or for compensating for interfering influences due to simplified hardware, for example for generating local oscillator signals by means of PLL, and/or for evaluating a signal phase for an estimation of speed, for an angle estimation and/or for an SAR processing.

The abovementioned object is also achieved by a radar system, in particular a secondary radar system, configured to carry out the above method and/or comprising a device of the type described above, wherein the radar system comprises a first and at least one second (non-coherent) transceiving unit.

In particular, the method according to the invention can be used to compensate for (phase) noise or for a systematic deviation and/or the corresponding device can be used in the method according to DE 10 2014 104 273 A A1 (hereinafter referred to as method I and configuration I) or in the method and configuration according to the as yet unpublished German patent application bearing the application number 10 2016 100 107.4 and the corresponding international patent application bearing the application number PCT/EP2017/050056 (hereinafter method II and configuration II). Method II or configuration II is a development of method I or configuration I.

DE 10 2014 104 273 A1 and the as yet unpublished patent applications DE 10 2016 100 107.4 and PCT/EP2017/050056 are intended to be incorporated by reference into the present application (in particular with regard to an underlying method in which the method according to the invention for compensating for (phase) noise and the corresponding device can be used).

In particular, the method according to the invention for compensating for (phase) noise or for a systematic deviation and the corresponding device can be used in a radar system, wherein a first signal is generated in a/the first (non-coherent) transceiving unit and is transmitted, in particular broadcast, over a path, a further first signal is generated in a further transceiving unit, in particular a second/the second transceiving unit, and is transmitted, in particular broadcast, over the path, a first comparison signal is formed in an evaluation device, in particular in the first transceiving unit, from the first signal of the first transceiving unit and from such a first signal received by the further transceiving unit over the path, and a further comparison signal is formed in the evaluation device, in particular in the further transceiving unit, from the first signal of the further transceiving unit and from such a first signal received by the first transceiving unit over the path, wherein the further comparison signal is preferably transmitted, in particular communicated, by the further transceiving unit to the first transceiving unit. The radar system, in particular the evaluation device, is preferably configured to form a comparison comparison signal from the first comparison signal and the further comparison signal. Furthermore, the comparison comparison signal may preferably correspond to a comparison signal generated by a coherent radar system, since the two comparison signals are processed with one another, in particular are conjugate complex multiplied. In one development, the radar system, in particular the evaluation device, may be configured in a first step to compensate for deviations of the comparison signals which are caused by systematic deviations in the transceiving units, and in a second step to use at least one complex value from a first of the two comparison signals or from a signal derived from said first comparison signal to adapt at least one complex value of the second of the two comparison signals or a value of a signal derived from said second comparison signal, and thus to form an adapted signal, wherein the adaptation takes place such that, by a mathematical operation, the vectorial sum or the difference of the complex values is formed or the sum or the difference of the phases of the complex values is/are formed. Further embodiments can be found in the aforementioned earlier patent applications (some of which had not yet been published at the time of filing).

The second (non-coherent) transceiving unit may in principle be constructed in a manner analogous to the first (non-coherent) transceiving unit and may optionally generate a third measurement signal (mixed signal), analogous to the first measurement signal (mixed signal), and a fourth measurement signal (mixed signal), analogous to the second measurement signal (mixed signal).

A non-coherent transceiving unit is to be understood to mean a transceiving unit, the transmitted signal of which is non-coherent with respect to the signal of a further transceiving unit (even if the signal of the first transceiving unit or of the further transceiving unit is coherent per se).

Insofar as calculations, evaluations or other method steps are carried out in the (respective) transceiving unit, this also includes an optionally physically independent evaluation device which is connected to the transceiving unit. By way of example, the respective transceiving unit may thus be configured as an assembly consisting of in particular one or more antennas with a few signal-generating or signal-processing components, while further components such as signal comparison units or an evaluation device are connected to such an assembly as structurally stand-alone components. Insofar as components are used, these may be configured, insofar as technically feasible, as so-called hardware formed of processing components and/or may be implemented as signal or data processing steps executed entirely or partially in a processor.

In general, an evaluation device may be a constituent part of one or more (both) transceiving units or may be connected to one or more (both) such transceiving units. A physically stand-alone evaluation device may optionally be provided, which is connected to the respective transceiving unit or to the other components of the respective transceiving unit. Alternatively, an evaluation device may optionally be integrated in the first and/or the further (non-coherent) transceiving unit, for example in a common housing and/or as a structural unit.

Exemplary embodiments will be explained in greater detail below on the basis of the figures.

In the figures.

In the following description, the same reference numerals are used for identical and equivalent parts.

One (optionally independent) aspect of this invention is based on the generation, reception and processing of two signals which are being or have been transmitted over the same transmission channel ÜK. One signal is characterized in particular in that a frequency shift due to (phase) noise is (exactly) opposite to a frequency shift due to (phase) noise of the other signal (which may be for example a conventional FMCW signal; with optionally just one frequency ramp). In addition, said signals are preferably transmitted and received simultaneously (at least in a temporally overlapping manner).

Figure 2:
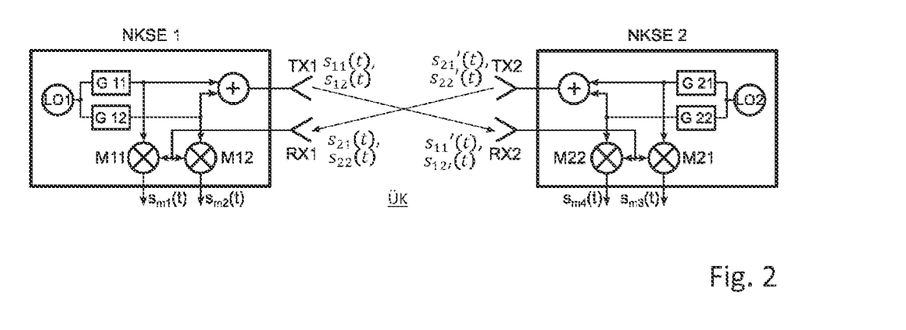
FIG. 2 shows a schematic structure of a radar system according to the invention.
Figure 3:
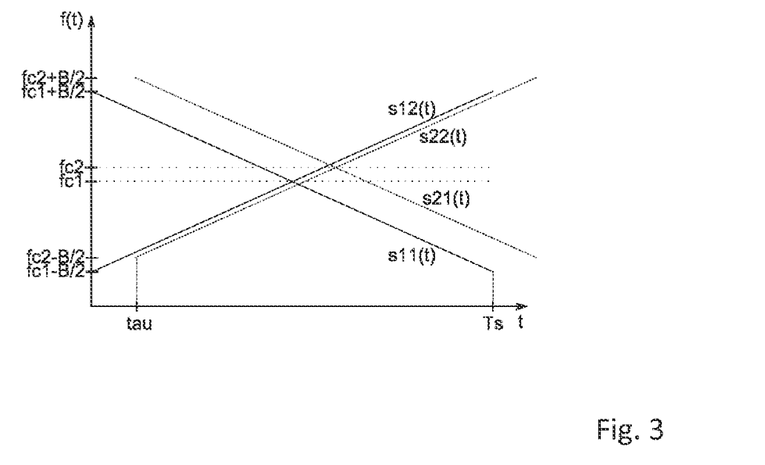
FIG. 3 shows a diagram of the characteristic of a frequency of used signals as a function of time.

FIG. 2 shows a schematic view of a possible structure in which, in the respective NKSE 1 and NKSE 2, the two signals ($s_{11}(t)$ and $s_{12}(t)$ or $s_{21}(t)$ and $s_{22}(t)$) are generated from the same clock source LO1 or LO2 by way of the modulation generators G11 and G12 or G21 and G22. Alternatively, it would also be possible to use a single modulator per NKSE, for example by means of direct digital synthesis (DDS). This has the result that the two transmitted signals are oppositely influenced by noise components (in particular by phase noise or uniformly occurring non-linearities of the FMCW ramps). The mixing process by way of the mixers M11 and M12 (or analogously by way of the mixers M21 and M22 on NKSE 2) generates in principle two signal components, of which a signal component relevant for the detection has a relatively low beat frequency and can be separated from a high-frequency component, for example by way of a low-pass filter configured as hardware and/or software. FIG. 3 shows a characteristic of transmitted and received signals over time. Here, $s_{11}(t)$ and $s_{12}(t)$ are the signals transmitted simultaneously by NKSE 1, and $s_{21}(t)$ and $s_{22}(t)$ are the signals transmitted (simultaneously) by NKSE 2 and received by NKSE 1. The signals $s_{12}(t)$ and $s_{22}(t)$ are characterized in that the frequency ramp has a positive slope. The comparison signals $s_{11}(t)$ and $s_{21}(t)$ are characterized by a negative slope of the frequency ramp over time. For the following description, it will be assumed that the distance to NKSE 2 is to be determined on NKSE 1. This requires in principle only a transmission of the signals from NKSE 2 to NKSE 1, but not vice versa. Analogously to this description, NKSE 2 (optionally alone) can also determine the distance to NKSE 1 if NKSE 1 transmits the signals. If the signals are transmitted in both NKSEs, the distance estimation may take place in both transceiving units simultaneously. In addition, it should initially be assumed that the two stations have been synchronized in time.

It should also be assumed that the two stations have been pre-synchronized in time, for example by way of a method from U.S. Pat. No. 7,940,743 or as described in Precise Distance and Velocity Measurement for Real Time Locating in Multipath Environments Using a Frequency-Modulated Continuous-Wave Secondary Radar Approach, S. Roehr, P. Gulden, M. Vossiek, 2008. This pre-synchronization serves primarily to ensure that relevant signal components are retained in the baseband after the low-pass filtering. Precise synchronization can take place by synchronizing clock sources, but also by post-processing and correcting the received signals according to the method described below.

In general, the characteristic in FIG. 3 serves only as one possible embodiment, so that a portion of this signal characteristic, which may also have been shifted in time (for example starting at Ts/2) may also be selected. Alternatively, the starting frequency may also be provided with an offset of B or −B for the two ramps, in order to prevent the two ramps from intersecting. One conceivable mode of implementation would also be the simultaneous use of multiple frequency ramps or multiple comparison signals on NKSE 1 and/or NKSE 2. The core concept of this invention can in principle also be transferred to other radar signal forms, such as for example Stepped Frequency Continuous Wave (SFCW) or Orthogonal Frequency-Division Multiplexing (OFDM), provided that the comparison signal (second measurement signal) is complex conjugate to the actual (first) measurement signal, that is to say that disturbances cancel each other out.

The signals transmitted by NKSE 2 and shown in FIGS. 2 and 3 can be described (initially assuming complete time synchronization) by $$s'_{21}(t) = e^{j2\pi\left(\left(f_{c2}+\frac{B}{2}\right)t-\frac{\mu}{2}t^2\right)}e^{j\varphi_{n2}(t)} \text{ and}$$

$$s'_{22}(t) = e^{j2\pi\left(\left(f_{c2}-\frac{B}{2}\right)t+\frac{\mu}{2}t^2\right)}e^{j\varphi_{n2}(t)}$$

where B is the bandwidth used by the radar system, $f_{c2}$ is the carrier frequency of NKSE 2, $\varphi_{n2}(t)$ is the phase noise of the local oscillator LO2, and $\mu=B/T_s$ is the sweep rate (that is to say the increase in frequency per unit of time). The received signals on NKSE 1 $s_{21}(t)=As'_{21}(t-\tau)$ and $s_{22}(t)=As'_{22}(t-\tau)$ are considered here as an attenuated and time-shifted version of the signal transmitted by NKSE 2.

The two linear frequency-modulated signals $$s_{11}(t) = e^{j2\pi\left(\left(f_{c1}+\frac{B}{2}\right)t-\frac{\mu}{2}t^2\right)}e^{j\varphi_{n1}(t)} \text{ and}$$

$$s_{12}(t) = e^{j2\pi\left(\left(f_{c1}-\frac{B}{2}\right)t+\frac{\mu}{2}t^2\right)}e^{j\varphi_{n1}(t)}$$

on NKSE 1 are dependent on the carrier frequency $f_{c1}$, the phase noise $\varphi_{n1}(t)$ of the local oscillator LO1 and the variables defined above.

After a process of mixing the signals received by NKSE 1 with the locally generated signals and low-pass filtering (preferably carried out by the hardware of the measuring system in order to reduce thermal noise and interference with other radio applications), the following mixed products are obtained $$s_{m1}(t) = s_{11}^*(t)s_{21}(t) =$$
$$Ae^{j2\pi\left((f_{c2}-f_{c1})t-\left(f_{c2}+\frac{B}{2}\right)\tau+\mu\tau t-\frac{\mu}{2}\tau^2\right)}e^{j(-\varphi_{n1}(t)+\varphi_{n2}(t-\tau))} = Ae^{j\Phi_{m1}(t)} \text{ and}$$

$$s_{m2}(t) = s_{22}^*(t)s_{12}(t) =$$
$$Ae^{j2\pi\left((-f_{c2}+f_{c1})t+\left(f_{c2}-\frac{B}{2}\right)\tau+\mu\tau t-\frac{\mu}{2}\tau^2\right)}e^{j(\varphi_{n1}(t)-\varphi_{n2}(t-\tau))} = Ae^{j\Phi_{m2}(t)}.$$

In a system with real-value sampling, the complex representation of the mixed signals may also take place, after digitization, by Hilbert transformation.

A complete calculation of the mixed products can be seen below.

For the argument $\Phi_{m2}(t)$ of $s_{m1}(t)$:

$$\Phi_{m1}(t) =$$
$$2\pi\left\{-\left[\left(f_{c1}+\frac{B}{2}\right)t-\frac{\mu}{2}t^2\right]+\left[\left(f_{c2}+\frac{B}{2}\right)(t-\tau)-\frac{\mu}{2}(t-\tau)^2\right]\right\} - \varphi_{n1}(t) + \varphi_{n2}(t)$$

$$= 2\pi\left\{-f_{c1}t-\frac{B}{2}t+\frac{\mu}{2}t^2+f_{c2}t+\frac{B}{2}t-f_{c2}\tau-\frac{B}{2}\tau-\frac{\mu}{2}(t^2-2t\tau+\tau^2)\right\} +$$
$$\Delta\varphi_n(t)$$

$$= 2\pi\left\{(f_{c2}-f_{c1})t+\frac{\mu}{2}t^2-f_{c2}\tau-\frac{B}{2}\tau-\frac{\mu}{2}t^2+\mu t\tau-\frac{\mu}{2}\tau^2\right\} + \Delta\varphi_n(t)$$

$$= 2\pi\left\{\Delta ft+\mu\tau t+\left(-f_{c2}-\frac{B}{2}\right)\tau-\frac{\mu}{2}\tau^2\right\} + \Delta\varphi_n(t)$$

For the argument $\Phi_{m2}(t)$ of $s_{m2}(t)$:

$$\Phi_{m2}(t) =$$
$$2\pi\left\{\left[\left(f_{c1}-\frac{B}{2}\right)t+\frac{\mu}{2}t^2\right]-\left[\left(f_{c2}-\frac{B}{2}\right)(t-\tau)+\frac{\mu}{2}(t-\tau)^2\right]\right\} + \varphi_{n1}(t) - \varphi_{n2}(t)$$

$$= 2\pi\left\{f_{c1}t-\frac{B}{2}t+\frac{\mu}{2}t^2-f_{c2}t+\frac{B}{2}t+f_{c2}\tau-\frac{B}{2}\tau-\frac{\mu}{2}(t^2-2t\tau+\tau^2)\right\} - \Delta\varphi_n(t)$$

$$= 2\pi\left\{-(f_{c2}-f_{c1})t+\frac{\mu}{2}t^2+f_{c2}\tau-\frac{B}{2}\tau-\frac{\mu}{2}t^2+\mu t\tau-\frac{\mu}{2}\tau^2\right\} - \Delta\varphi_n(t)$$

$$= 2\pi\left\{-\Delta ft+\mu\tau t+\left(f_{c2}-\frac{B}{2}\right)\tau-\frac{\mu}{2}\tau^2\right\} - \Delta\varphi_n(t)$$

Adding the two signal forms yields a synthetic mixed signal with the resulting argument $\Phi_{msyn}(t)$:

$$\Phi_{msyn}(t)=2\pi\{2\mu\tau t+B\tau-\mu\tau^2\}$$

The square term can usually be ignored here (particularly in the case of narrowband radar systems with relatively slow FMCW chirps and ranges of a few hundred meters), since $\mu\tau^2 \ll B\tau$.

As a result, both mixed signals have positive frequency components which are dependent on the propagation time.

It is thus possible (by differentiation) to determine (calculate) the two beat frequencies $$f_{b11}(t) = \frac{1}{2\pi}\frac{d\Phi_{m1}(t)}{dt} =$$

-continued $$f_{c2} - f_{c1} + \mu\tau - \frac{1}{2\pi}\frac{d}{dt}(\varphi_{n2}(t-\tau) - \varphi_{n1}(t)) = \Delta f + \mu\tau + \delta f(t) \text{ and}$$

$$f_{b12}(t) = \frac{1}{2\pi}\frac{d\Phi_{m2}(t)}{dt} =$$

$$f_{c1} - f_{c2} + \mu\tau + \frac{1}{2\pi}\frac{d}{dt}(\varphi_{n1}(t) - \varphi_{n2}(t-\tau)) = -\Delta f + \mu\tau - \delta f(t)$$

which are subject to a statistical deviation due to the correlated noise component δf(t) and a deterministic frequency shift Δf (caused by different carrier frequencies on NKSE 1 and NKSE 2). On account of the complex conjugate phase characteristic of the mixed signals, these two components cause the signal $f_{b11}(t)$ to shift towards the higher frequencies and cause the signal $f_{b12}(t)$ to shift towards the lower frequencies, if these two variables assume a positive value.

Summing then yields a synthetic measurement signal having the measurement frequency $$f_b(t) = f_{b11}(t) + f_{b12}(t) = 2\mu\tau,$$

which no longer has any dependence on the correlated phase noise δf(t) and on the frequency shift Δf. This result can be solved for τ and the distance between NKSE 1 and NKSE 2 can be estimated via the relationship τ=x/c₀, using the propagation speed c₀ of the electromagnetic wave (usually in air). Due to the linear relationship, it is possible to detect multiple objects, that is to say to receive multiple time-shifted and attenuated copies (superposition, or linear combination of target responses) of the transmitted signal.

The phases of the two mixed signals can be grouped as follows:

$$\Phi_{m1}(t) = \underbrace{(2\pi(\Delta ft - f_{c2}\tau) + \Delta\varphi_n(t))}_{\Phi_1(t)} + \underbrace{2\pi\mu\tau t}_{\Phi_2(t)} + \underbrace{2\pi\left(-\frac{B}{2}\tau - \frac{\mu}{2}\tau^2\right)}_{\Phi_3} = \Phi_1(t) + \Phi_2(t) + \Phi_3$$

$$\Phi_{m2}(t) = -\underbrace{(2\pi(\Delta ft - f_{c2}\tau) + \Delta\varphi_n(t))}_{\Phi_1(t)} + \underbrace{2\pi\mu\tau t}_{\Phi_2(t)} + \underbrace{2\pi\left(-\frac{B}{2}\tau - \frac{\mu}{2}\tau^2\right)}_{\Phi_3} =$$

$$-\Phi_1(t) + \Phi_2(t) + \Phi_3$$

This May be Followed by a Fourier Transformation $$S_{m1}(f) = \mathcal{F}\{s_{m1}(t)\} = \mathcal{F}\{Ae^{j(\Phi_1(t)+\Phi_2(t)+\Phi_3)}\} = A\mathcal{F}\{e^{j\Phi_1(t)}\} * \delta(f-\mu\tau)e^{j\Phi_3},$$

$$S_{m2}(f) = \mathcal{F}\{s_{m2}(t)\} = \mathcal{F}\{Ae^{j(\Phi_1(t)+\Phi_2(t)+\Phi_3)}\} = A\mathcal{F}\{e^{j\Phi_1(t)}\} * \delta(f-\mu\tau)e^{j\Phi_3},$$

of the two time signals $s_{m1}(t)$ and $s_{m2}(t)$, wherein the associations $\Phi_2(t)=2\pi\mu\tau t$ and $\Phi_3=-\pi B\tau$ apply (according to the assumptions above, the term $\mu\tau^2/2$ is negligibly small). $\Phi_1(t)$ contains all the remaining components, the phase shifts of which in $s_{m1}(t)$ and $s_{m2}(t)$ behave in a manner complex conjugate to one other. The signal $S_{m1}(f)$ in the frequency domain has an absolute maximum at the abscissa value $f_{max,1}=\Delta f+\mu\tau+\delta f(t)$, and $S_{m2}(f)$ at $f_{max,2}=-\Delta f+\mu\tau-\delta f(t)$. If the phase value of these two signals belonging to the maximum is then determined, this yields on the one hand $\psi_{max,1}(t)=\Phi_1(t)+\Phi_3$ and on the other hand $\psi_{max,2}(t)=-\Phi_1(t)+\Phi_3$, where the sum $\psi_0=\psi_{max,1}(t)+\psi_{max,2}(t)=2\Phi_3$ of these phase values yields the synthetic phase $$\psi_1=\psi_{max,1}(t)+\psi_{max,2}(t)=-2\pi B\tau$$

A phase value can thus be determined which is proportional to the distance value or to the channel propagation time. The phase deviation of the synthetic mixed signal is in this case dependent only on the thermal noise, but not on the phase noise of the local oscillators used. The closed assessment of the synthetic mixed product $f_b(t)$ and also of the determined synthetic signal phase $\psi_1$ is thus particularly advantageous for an accurate distance estimation.

If a time shift $T_0$ occurs with respect to the start time of the FMCW sequence, it is known from WO 2010/019975 A1 that the synthetic mixed frequencies $f_{b1}(t)=2\mu(\tau-T_0)$ in NKSE 1 and $f_{b2}(t)=2\mu(\tau+T_0)$ in NKSE 2 are obtained. By mutual assessment (respective addition), the unknown time offset can thus be corrected. With the described signal form, this is advantageously also possible via the detected phase deviation, since $\psi_1=2\pi B(\tau-T_0)$ applies on NKSE 1 and $\psi_2=-21B(\tau+T_0)$ applies on NKSE 2. The phase shift of the determined phase values with respect to one another is thus linearly dependent on the propagation time r in the channel and on the time offset $T_0$. The deviation that occurs can be determined by subtraction and can be corrected. Alternatively, an estimated value for the distance or the channel propagation time can also be determined directly by addition. Furthermore, this synchronization method does not require any simultaneous transmission and reception by both stations (duplex mode), but instead can take place sequentially.

With particular advantage, the unambiguity range of the phase estimation $\psi_0$ can be influenced by changing the start frequencies of the FMCW chirps, that is to say the parameter B, since this, depending on the quality of the pre-synchronization, changes the phase deviation of the two mixed signals with respect to one another. This type of time synchronization can also be carried out in stages, by changing the start frequencies of upsweep and downsweep. A very precise synchronization can be achieved with start frequencies which are far apart, that is to say with a large "spacing" B of the two FMCW ramps.

Figure 4:
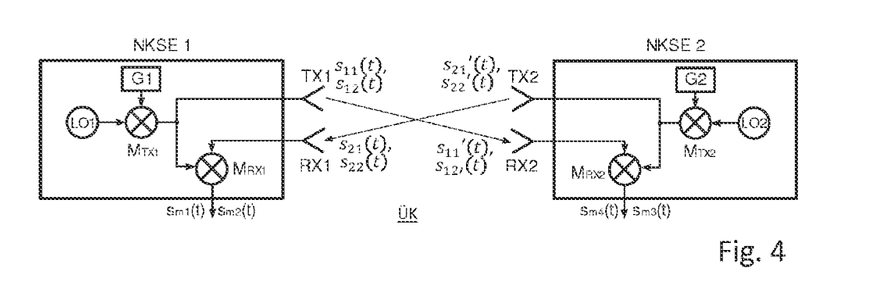
FIG. 4 shows an alternative embodiment of a radar system according to the invention in a schematic representation.

FIG. 4 shows a system diagram of an embodiment with a complex mixer and upconversion in the transmission branch. The block diagram shown in FIG. 2 contains two real-value mixers which are used to separate upsweep and downsweep and which can also be replaced by a complex mixer ($M_{RX1}$ in FIG. 4). Here, one mixed signal is generated with a positive frequency and one is generated with a negative frequency. It would also be possible for the two modulation generators G1 and G2 of NKSE 1 in FIG. 2 to be replaced by just one (G1 in FIG. 4). The signal thereof can then be mixed by a transmitting mixer $M_{TX1}$, wherein the two transmission signals can represent an upper and lower sideband. In addition, the two low-frequency mixing products in the case of a secondary radar can preferably be separated by a suitable choice of frequency offset or time offset between the two stations. If chosen appropriately, the use of a complex mixer would be unnecessary, since the two mixing products appear at different positions in the spectrum.

Figure 5:
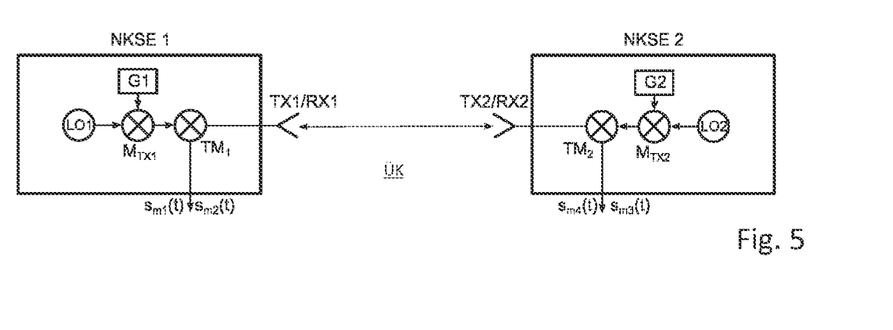
FIG. 5 shows another alternative embodiment of a radar system according to the invention in a schematic representation.

FIG. 5 shows a system diagram with a transmission mixer and upconversion in the transmission branch. The embodiment shown in FIG. 5 contains a single transmitting and receiving antenna instead of two separate antennas, said single antenna being used jointly for transmitting and receiving. For this, use can be made of a transmission mixer TM which has advantageous transmission properties, particularly in the case of FMCW systems. With this concept, too, complex sampling can be omitted if the two stations have an advantageously selected offset of carrier frequency and start time of the respective FMCW signals.

In principle, the method described above for suppressing interfering influences can also be used to reduce the hardware requirements (such as the quality of the phase-locked loop) for generating a high-frequency carrier signal with little phase noise. The resulting errors can then subsequently be compensated for by the described processing.

A few use examples of the invention will be explained in greater detail below:

It is generally known that the accuracy of a distance estimation in a radar system increases as the signal-to-noise ratio (SNR) increases. An indirect proportionality of a signal power with respect to a square of the distance (in secondary radar systems) represents a significant difference to primary radar systems, since the SNR in the latter decreases with the fourth power of the distance. In addition, in the former system, there is no correlation (and therefore no phase noise suppression) by the mixing process. Therefore, given a sufficiently high signal-to-noise ratio, the phase noise (which is largely independent of the distance) often has a greater influence on the measurement accuracy than thermal noise.

The invention can be used for example in an industrial environment, for example for position determination on cranes, as a landing aid, as a locating beacon, on container vehicles and/or on rail-bound or free-moving vehicles. A precise positioning of objects can thus be achieved, which can be used for example for process automation, to optimize production or storage processes, and/or to avoid collisions. This positioning may take place on the basis of a 1D estimation, but a distance between a multiple distributed radar stations can also be determined. In the 2D or 3D case, a position in a plane (or in space) can be determined preferably by means of a multilateration.

Another advantageous use of the method according to the invention are systems in which the generation of a signal with relatively low phase noise (for example with the aid of an optimized phase-locked loop) is omitted. Particularly in mobile radar units, this signal generation represents a significant effort in the production, which emerges as increased hardware costs and an increased energy demand. By virtue of the invention, the associated higher (phase) noise component can thus be reduced or eliminated.

The embodiments shown in FIGS. 4 and 5 can be used with particular preference for simplified signal generation. In this case, a mirror frequency after the upmixing can usefully be used as a comparison signal. In conventional radar systems, this must be suppressed with considerable effort.

Another use may be security-related applications, such as "Keyless Go" for example. One possible form of attack on such a system is the so-called "relay attack", which is carried out from a remote (radar station), wherein another subscriber can actively engage in the conversation. In this case, an FMCW signal is used not only for a radar application but also for communication. By shifting the frequency of the local oscillator, the (real-time-capable) third communication unit can synthesize smaller distances, listen in on the communication and/or participate in the latter. This cannot be achieved simply by adjusting to a shifted local oscillator frequency (in particular in the case of the signal characteristic shown in FIG. 3).

In addition, the invention optionally enables the determination of a phase value which is proportional to the distance or to a channel propagation time. In a mode with multiple successive chirps (Chirp Sequence Radar), both the distance and the speed of a target can be estimated for example by means of a 2D FFT. In this case, the unambiguity range is dependent on the bandwidth B and not, as in primary radar systems, on the carrier frequency.

On account of a (significant) enlargement of the unambiguity range, lower requirements can be placed on the time sequence of individual FMCW chirps.

With the aid of phase detection, it is also possible to estimate the difference phase between a moving (non-coherent) transceiving unit and multiple distributed (non-coherent) transceiving units, wherein the distributed (non-coherent) transceiving units optionally have a fixed, known position in space. Using the phase differences, it is possible to determine an azimuth or elevation angle with respect to the moving (non-coherent) transceiving unit, or also a position. It is particularly advantageous to use this information in combination with holographic evaluation methods, since a movement creates a large aperture and a very accurate (or high-resolution) estimation of angle or position is possible.

It should be noted at this point that all the parts and functions described above are claimed as essential to the invention individually and in any combination, particularly the details shown in the drawings. Modifications thereof are familiar to a person skilled in the art.

LIST OF REFERENCE SIGNS

G1 modulation generator
G11 modulation generator
G12 modulation generator
G2 modulation generator
G21 modulation generator
G22 modulation generator
LO1 first local oscillator
LO2 second local oscillator
M1 mixer
M2 mixer
M11 mixer
M12 mixer
M21 mixer
M22 mixer
$M_{RX1}$ (complex) mixer
$M_{RX2}$ (complex) mixer
$M_{TX1}$ transmitting mixer
$M_{TX2}$ transmitting mixer
NKSE non-coherent transceiving unit
NKSE 1 first non-coherent transceiving unit
NKSE 2 second non-coherent transceiving unit
RX1 receiving antenna
RX2 receiving antenna
$s_{11}(t)$ first first signal
$s_{12}(t)$ second first signal
$s_{21}(t)$ first second signal
$s_{22}(t)$ second second signal
$T_{M1}$ transmission mixer
$T_{M2}$ transmission mixer
TX1 transmitting antenna
TX1/RX1 transmitting/receiving antenna
TX2 transmitting antenna
TX2/RX2 transmitting/receiving antenna
ÜK transmission channel

The invention claimed is:

1. A method for compensating for noise in a secondary radar system, the method comprising:
   using a first transceiver, transmitting a first transmission signal from the first transceiver ($s_{11}(t)$) containing a first interfering component, caused by the noise;
   using the first transceiver, transmitting a second transmission signal ($s_{12}(t)$) containing a second interfering component, caused by the noise, in a temporally overlapping manner with the first transmission signal ($s_{11}(t)$), the first transmission signal from the first transceiver ($s_{11}(t)$) comprising at least one frequency ramp with a first slope and the second transmission signal from the first transceiver ($s_{12}(t)$) comprising at least one frequency ramp with a second slope having a sign opposite the first slope; and
   compensating for at least one of phase shifts or frequency shifts resulting from the first and second interfering components by evaluation of the first and second transmission signals, the compensation comprising:
   receiving, using the first transceiver, a first transmission signal from a second transceiver ($s_{21}(t)$);
   generating a first measurement signal ($s_{m1}(t)$) using mixing or correlation of the first transmission signal from the first transceiver ($s_{11}(t)$) and the first transmission signal from the second transceiver ($s_{21}(t)$);
   receiving, using the first transceiver, a second transmission signal from the second transceiver ($s_{22}(t)$); and
   generating a second measurement signal ($s_{m2}(t)$) using mixing or correlation of the second transmission signal from the first transceiver ($s_{12}(t)$) and the second transmission signal from the second transceiver ($s_{22}(t)$);
   wherein the first measurement signal ($s_{m1}(t)$) and the second measurement signal ($s_{m2}(t)$) comprise respective components including complex conjugate representations of each other, the respective components corresponding to the first and second interfering components.

2. The method according to claim 1, wherein a first interfering component, resulting from the noise, of the first measurement signal ($s_{m1}(t)$) and a second interfering component, resulting from the noise, of the second measurement signal ($s_{m2}(t)$) are complex conjugates of each other.

3. The method according to claim 1, wherein the first transmission signal from the first transceiver ($s_{11}(t)$) has at least one first factor which represents a complex conjugate to a second factor of the second transmission signal from the first transceiver ($s_{12}(t)$).

4. The method according to claim 1,
   wherein values of the first and second slopes are substantially equal.

5. The method according to claim 1, wherein a base signal used for generation of the first ($s_{m1}(t)$) and second ($s_{m2}(t)$) measurement signals, or for the first transmission signal from the first transceiver ($s_{11}(t)$) and second transmission signal from the first transceiver ($s_{12}(t)$) is generated by a shared generator.

6. The method according to claim 1, wherein the first transmission signal from the first transceiver ($s_{11}(t)$) or the first measurement signal ($s_{m1}(t)$) is based on an output of a first modulation generator (G11); and
   wherein the first transmission signal from the second transceiver ($s_{21}(t)$) or the second measurement signal ($s_{m2}(t)$) is based on an output of a second modulation generator (G12).

7. The method according to claim 1, wherein a fundamental signal for at least one of the first transmission signal from the first transceiver ($s_{11}(t)$) or the second transmission signal from the first transceiver (($s_{12}(t)$) is generated and then the respective transmission signal is modulated using a vector modulator; and
   wherein at least one of the first transmission signal from the first transceiver ($s_{11}(t)$) or the second transmission signal from the first transceiver (($s_{12}(t)$)_is_generated by applying a modulation signal to a real signal input or complex signal input of the vector modulator, to contemporaneously generate the first transmission signal ($s_{11}(t)$) and a mirror representation of the first transmission signal ($s_{11}(t)$) defining the second transmission signal from the first transceiver (($s_{12}(0)$).

8. The method according to claim 1,
   wherein a frequency corresponding to propagation time information, is derived from at least one of the first ($s_{m1}(t)$) or second ($s_{m2}(t)$) measurement signals.

9. The method according to claim 1,
   wherein the first measurement signal ($s_{m1}(t)$) is generated by a first mixer (M11) and the second measurement signal ($s_{m2}(t)$) is generated by a second mixer (M12).

10. The method according to claim 1, wherein the first and second measurement signals ($s_{m1}(t)$, $s_{m2}(t)$) comprise mixer outputs representing products of one of frequency modulated continuous wave (FMCW) ramps, which are generated using incoherent local oscillators comprising a first local oscillator in the first transceiver and a second local oscillator in the second transceiver.

11. The method according to claim 1,
   wherein a clock offset between the first transceiver and the second transceiver is determined by comparing the measurement signals.

12. The method of claim 1, wherein a beat frequency corresponding to propagation time information, is derived from at least one of the first or second measurement signals.

13. A system for compensating for noise in a secondary radar system, the system comprising:
   a first transceiver configured to:
   generate and transmit a first transmission signal ($s_{11}(t)$) containing a first interfering component, caused by the noise, the first transmission signal ($s_{11}(t)$) comprising at least one frequency ramp with a first slope; and
   generate and transmit, in a temporally overlapping manner, a second transmission signal ($s_{12}(t)$) containing a second interfering component, caused by the noise, the second transmission signal ($s_{12}(t)$) comprising at least one frequency ramp with a second slope having a sign opposite the first slope;
   evaluation hardware configured to compensate for at least one of phase shifts or frequency shifts resulting from the first and second interfering components using the transmission signals, the compensating comprising:
   receiving, using the first transceiver, a first transmission signal from a second transceiver ($s_{21}(t)$);
   generating a first measurement signal ($s_{m1}(t)$) using mixing or correlation of the first transmission signal from the first transceiver ($s_{11}(t)$) and the first transmission signal from the second transceiver ($s_{21}(t)$);
   receiving, using the first transceiver, a second transmission signal from the second transceiver ($s_{22}(t)$); and
   generating a second measurement signal ($s_{m2}(t)$) using mixing or correlation of the second transmission signal from the first transceiver ($s_{12}(t)$) and the second transmission signal from the second transceiver ($s_{22}(t)$);

wherein the first measurement signal ($s_{m1}(t)$) and the second measurement signal ($s_{m2}(t)$) comprise respective components including complex conjugate representations of each other, the respective components corresponding to the first and second interfering components.

14. The system according to claim 13, wherein a first interfering component of the first measurement signal ($s_{m1}(t)$) and a second interfering component of the second measurement signal ($s_{m2}(t)$) represent complex conjugates of each other.

15. The system according to claim 13, wherein the first transmission signal from the first transceiver ($s_{11}(t)$) has a first factor which represents a complex conjugate to a second factor of the second transmitted signal ($s_{12}(t)$).

16. The system according to claim 13,
wherein the first transceiver comprises a transmitting antenna (TX) and a receiving antenna (RX) such that the transmitting antenna (TX) transmits the first transmission signal ($s_{11}(t)$) and the second transmission signal ($s_{12}(t)$) and the receiving antenna (RX) receives the first transmission signal ($s_{21}(t)$) from the second transceiver and the second transmission signal from the second transceiver ($s_{22}(t)$).

17. The system according to claim 13, comprising one or more mixers (configured to generate at least one of the first measurement signal ($s_{m1}(t)$) and to generate the second measurement signal ($s_{m2}(t)$).

18. The system according to claim 13, comprising a joint mixer configured to generate the first measurement signal and the second measurement signal by mixing.

19. The system according to claim 13, comprising a shared generator for generating a base signal for the first measurement signal ($s_{m1}(t)$) and the second measurement signal ($s_{m2}(t)$) measurement signal or for the first transmission signal ($s_{11}(t)$) and the second transmission signal ($s_{12}(t)$).

20. The system according to claim 13, comprising a vector modulator including an output configured to provide the first transmission signal ($s_{11}(t)$) and the second transmission signal ($s_{12}(t)$).

21. The system of claim 13, further comprising the second transceiver.

22. The system of claim 13, wherein a beat frequency corresponding to propagation time information, is derived from at least one of the first or second measurement signals.

* * * * *